United States Patent

[11] 3,586,980

[72] Inventor Friedrich J. Kraussser
Jericho, N.Y.
[21] Appl. No. 682,064
[22] Filed Nov. 13, 1967
[45] Patented June 22, 1971
[73] Assignee Emerson Electric Co.

[54] FREQUENCY MODULATION-DEMODULATION CIRCUIT
5 Claims, 7 Drawing Figs.

[52] U.S. Cl. .......... 325/349
[51] Int. Cl. .......... H03d 3/04
[50] Field of Search .......... 325/349, 487, 320; 329/126, 129, 130

[56] References Cited

UNITED STATES PATENTS

| | | | |
|---|---|---|---|
| 2,113,214 | 4/1938 | Luck | 329/126 X |
| 2,847,566 | 8/1958 | Metzger | 325/487 X |
| 2,956,227 | 10/1960 | Pierson | 329/129 X |
| 3,022,462 | 2/1962 | Keider, Jr. | 325/487 X |
| 3,172,047 | 3/1965 | Ronzheimer | 329/126 |
| 3,355,669 | 11/1967 | Avins | 329/129 X |
| 3,431,503 | 3/1969 | Heinz et al. | 325/349 X |

OTHER REFERENCES

RADIO AMATEUR' S HANDBOOK, 42nd Edition, 1965 pps. 30— 31

*Primary Examiner*—Robert L. Griffin
*Assistant Examiner*—Anthony H. Handal
*Attorney*—Henry L. Burkitt

ABSTRACT: The frequency modulation (FM) signal received by an FM receiver contains the basic signal frequency, noise in the form of amplitude disturbances, and the audio signal as the frequency modulator. The receiver, by means such as a limiter circuit, produces a series of square wave pulses whose repetition rate is dependent upon the frequency deviation, i.e., the modulation signal. Then, in a discriminator counter detector circuit, the square wave pulse is differentiated to the form of a sharp pulse by means such as a differential network. The pulse may then be amplified by means such as a pulse amplifier; the width of the pulse—but not its height—is expanded by an expanding circuit; and then the pulse may be integrated by an integrating circuit. The output of the integrating circuit is the demodulated audio signal.

INVENTOR
FRIEDRICH J. KRAUSSER
BY Henry L. Burkitt
ATTORNEY

FREQUENCY MODULATION-DEMODULATION CIRCUIT

DESCRIPTION

The present invention relates to frequency modulation (FM) radio, and more particularly to a limiting and detecting circuit for an FM radio receiver.

The advantages of frequency modulation (FM) radio, such as its relatively low noise and wide-frequency band, have resulted in the increasing popularity of FM radio receivers and their use so the sound receiver in television sets. The antenna of an FM radio receiver receives the broadcast electromagnetic waves. The FM waves ideally are in the form of a constant amplitude repeating wave whose frequency is modulated by the audio signal at the broadcasting station. The ideal constant amplitude of the FM signal is distorted, however, as, for instance, by noises, such as auto ignitions and the like.

The FM receiver separates out and amplifies the audio signal from the electromagnetic waves received by its antenna. The separation should include two functions — first, the changing of the received FM signal into a signal all of whose waves have the same amplitude. This removes most of the noise, which affects the amplitude, but not the frequency of the transmitted waves. The circuit which accomplishes this function is called a "limiter" in that it limits the amplitudes of the waves. The second function is to demodulate (separate) the audio signal, i.e., the modulator, from the entire received wave. This is accomplished by a "discriminator" circuit, as it discriminates between the constant frequency and its modulating audio signal.

Various types of discriminatory circuits are utilized in FM receivers. One type is called a "Foster Seeley" circuit. It relies upon resonate tuned circuits and phase differences and separates the audio modulation. This type of circuit may produce a distorted output because of its limited bandwidth and its poor alignment. Its tuned circuits may not remain constant, due to age and to temperature variations. In addition, it may be relatively costly to adjust the tuned circuits accurately.

An alternative type of discriminator circuit is called a "ratio detector." That type of circuit balances the output from two diodes, usually across a capacitor, to obtain the audio signal. The ratio detector circuit may also be costly to balance accurately. In addition, it has a narrow bandwidth, in the order of 1 mc., and does not permit low capture ratio values. The capture ratio expresses the ability of a receiver to reject unwanted FM stations and interferences on the same frequency as the desired station.

In the case here, the invention uses, as a discriminator circuit, a "counter detector." This type of circuit shapes the incoming waves to provide a uniform series of pulses. The number of such pulses per unit of time, i.e., the repetition rate, is directly proportional to the frequency deviation of the incoming signal. The frequency deviation is produced by the modulator, i.e., the audio signal. The voltage output of the counter detector is led to an integrating circuit whose output is the demodulated audio signal. It has been found that, for most effective results, the frequency to which the storage detector should be tuned is 10.7 mc., the center of the FM band, which requires a detector having a broad bandwidth of frequency response.

It is the objective of the present invention to provide a limiter and discriminator circuit for an FM receiver, which discriminator circuit is relatively low in cost, low in noise, has a wide bandwidth, and does not require alignment.

It is a further objective of the present invention to provide a counter detector circuit which is responsive at 10.7 mc., the center of the FM band, and has a broad bandwidth of 20 mc.

It is a further objective of the present invention to provide a counter detector circuit which may be produced by microcircuit techniques.

It is a further objective of the present invention to provide a counter detector circuit which is not adversely affected by age and temperature variations.

It is a further objective of the present invention to provide a counter detector circuit having a low-harmonic distortion (undesired overtones not present in the original program material), for example, of below 0.2 percent.

In accordance with the present invention, the counter detector circuit provided for an FM radio receiver includes a limiting (clipping) amplifier which is connected to the intermediate-frequency amplifier of the receiver. The limiter produces pulses which are substantially uniform square waves. The limiter is connected to a network which converts the square wave pulses into sharp pulses. The sharp pulses, for example, may be produced by a differential network, which may be a resistance-capacitor or a resistance-inductance network. The differential network is preferably connected to a pulse amplifier. The pulse amplifier is preferably connected to a pulse expander, which utilizes storage means to broaden the shape of the pulse. The pulse expander is preferably connected to an integrating circuit whose output is the demodulated audio signal.

The differential circuit may be particularly positioned after the limiter, at a low amplification level, to avoid noise. The circuit may be particularly designed to utilize a switching transistor having a rapid rise and fall time, to provide a low noise device.

Other objectives of the invention will be set forth herewith, or will be apparent from the description and the drawings, in which are illustrated an embodiment exemplifying the invention.

The invention, however, is not intended to be restricted to any particular construction, or any particular arrangement of parts, or any particular application of any such construction of rearrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the Statues for disclosure of an operative embodiment, but not to show all the various forms and modifications in which the invention might be embodied.

In the drawings, in which the same reference characters refer to the same parts throughout, and in which are disclosed such practical constructions:

Figure 1:
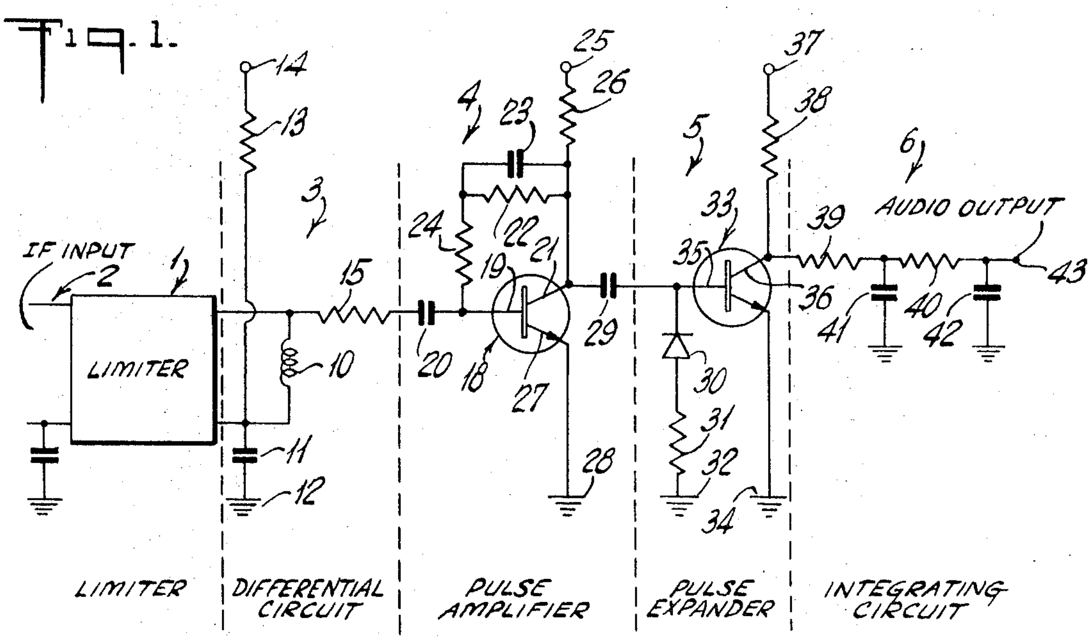
FIG. 1 is a schematic circuit wiring diagram of a counter detector embodying features of the invention.

The detector circuit of the present invention is illustrated in FIG. 1. The circuit includes a limiter 1. Preferably the limiter 1 is an integrated circuit amplifier, such as type CA 3012 of Radio Corporation of America With an input voltage of over 500 microvolts, the limiter 1 provides an almost perfect pulse of square waveform, shown in FIG. 2A. The rise and fall time of the pulse is about 4 nanoseconds into a 330 -ohm load. The limiter 1 is connected, at its input side, for example, to the output 2 of the intermediate frequency amplifier of an FM radio receiver. The amplifier CA 3012 is a wide-band amplifier limiter consisting of three direct-coupled cascaded differential-amplifier stages and an internal regulated power supply. It has ten transistors and seven diodes. The amplifier CA 3012 has been integrated with additional resistors and diodes to form the integrated amplifier-discriminators CA 3013 and CA 3014. However, those discriminators require an external turned phase-shift transformer and are subject to the same distortions, with age or heat, as other circuits relying upon tuned networks for demodulation.

Figure 2A:
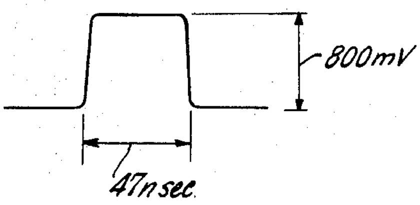
FIGS. 2A, 2B, 2C and 2D are graphic illustrations of waveforms appearing at different points in the circuit of FIG. 1.

The square wave pulse, FIG. 2A, produced by limiter (clipper) 1 is substantially uniform in width and height (amplitude). This eliminates noise which may have caused amplitude variations in the received signal.

Figure 3A:
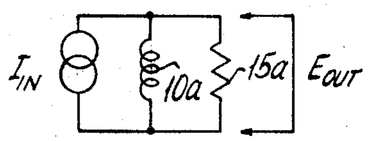
FIGS. 3A and 3B are equivalent circuits for a portion of the circuit of FIG. 1
Figure 3B:
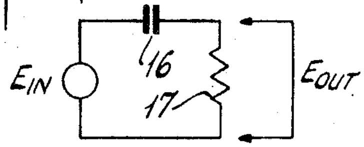

The limiter 1 is preferably connected, at its s output side, to a differential circuit 3. The differential circuit includes inductance 10, capacitor 11 leading to ground 12, resistor 13 leading to a 20-volt voltage supply 14, and resistor 15. The differential circuit, consisting of inductance 10 and resistance 15, is electrically equivalent to the circuit shown in FIG. 3A, which may include inductor 10*a* and resistor 15*a*, in parallel. Another circuit, which may also be used as the differential circuit, is shown in FIG. 3B. It consists of the series connection of capacitor 16 and resistor 17. The time constant (TC) the circuits of FIGS. 3A and 3B is $TC=L/R_1=R_2C$, where $L$ is the inductance of inductor 10*a*, $R_1$ is the resistance of resistor 15*a*, $C$ is the capacitance of capacitor 16, and $R_2$ is the resistance of resistor 17. Preferably the time constant (TC) is 10 nanoseconds. An R-L type differential circuit has been used in the circuit of FIG. 1 since the limiter presents a current source. It is presently considered that integrated circuit design (monolithic) does not permit the use of inductance coils of the size required. For the purpose of integration, it is preferable to use a resistor-capacitor type differentiator which results in smaller components. However, a resistor-capacitor differentiator requires a voltage source drive, which would require that an emitter follower be added to the limiter 1.

Figure 2B:
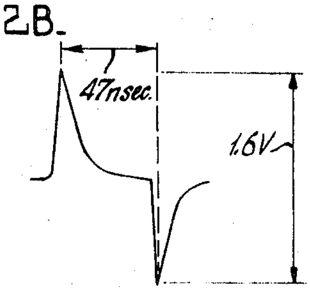

The differential circuit 3 changes the square wave pulse of FIG. 2A, shown as 47 nanoseconds wide and 800 millivolts, into the positive and negative peak pulses of FIG. 2B, shown as 47 nanoseconds wide and 1.6 volts. The output of the differential circuit 3 is preferably connected to the input of the pulse amplifier 4.

The pulse amplifier 4 may be, for example, a single transistor having a high cutoff frequency, low collector-to-base feedback capacitance, and good linearity. The transistor 18, in the circuit of FIG. 1, is shown as being connected, at its base 19, through capacitor 20 to the differential circuit 3. The feedback path is from collector 21 through the R-C network of resistance 22 and capacitor 23 and resistor 24 to the base 19 of transistor 18. The voltage feedback may be employed to insure good stability and improve linearity. The collector 21 is connected to power source 25, in this case, for example, of 28 volts, through resistor 26. The emitter 27 of transistor 18 is connected to ground 28.

The transistor 18 provides a low impedance drive source (voltage drive) for the following switching transistor 33. The voltage drive provided by transistor 18 results in a reliable circuit since the influence of the transistor $h_{fe}$ tolerance (small signal forward-current transfer ratio, short circuit —common emitter configuration) may be neglected.

Figure 2C:
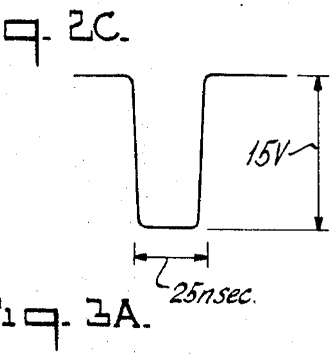

It is the function of the pulse expander 5 to expand the pulse, having a narrow exponential shape, as delivered by the pulse amplifier 4, to the nearly rectangular shaped pulse shown in FIG. 2C. The rectangular pulse provides the maximum possible audio output, the optimum signal-to-noise ratio, and a minimum of harmonic content.

The output signal from the counter detector, applied to the integrating circuit, preferably has a maximum energy, or else the signal derived from the integrating circuit may be effectively used. The energy of the signal produced by the integrating circuit depends upon the amplitude, width and repetition rate (or frequency) of the pulses produced by the counter detector. To increase the amplitude of the demodulated signal provided by the integrating circuit, the pulse amplitude, width or repetition rate must be increased. The repetition rate of the pulses cannot be increased as the rate is in proportion to the frequency of the received FM signal. The amplitude of the pulses depends upon the power sources and biasing of the transistors. The power source voltage is usually fixed at approximately 20 or 25 volts. The width of the pulses may be increased without affecting the rate. It is the function of the pulse expander circuit 5 to increase the width of the pulse and thereby increase the audio output of the integrating circuit.

The output of the pulse amplifier 4 is taken from collector 21 to capacitor 29. The opposite side of capacitor 29 is the input to the pulse expander circuit 5, which includes diode 30 and the transistor 33. The opposite side of capacitor 29 is also connected through the diode 30 and resistor 31, to ground 32. The emitter of transistor 33 is connected to ground 34, its base 35 is connected to capacitor 29 and its collector 36 is connected to voltage supply 37, for example, of 20 volts, through resistor 38.

Transistor 33 is, in the example of the present embodiment, selected to be a switching transistor having a fast rise and fall time and a controlled storage time. The storage time (*ts*) is the length of time that the output current remains at its maximum value after the input current is reversed. The length of storage time is governed by the characteristics of the transistor, its degree of saturation, and by the amount of reverse (turnoff) base current supplied. Biasing is accomplished by rectification of the input signal by the diode action of the base-emitter of transistor 33 and the diode 30. The value of resistor 31 may be varied to permit adjustment of the bias voltage ($V_{BE}$) toward positive or negative values and thereby control of the transistor "ON" to "OFF" time ratio. As a result of the storage and biasing of transistor 33, the output pulse, shown at FIG. 2C, closely approaches being completely rectangular. The width of the output pulse which may be obtained is 25 NSEC and its rise and fall times are less than 8 NSEC, at 15 volts.

The collector 36 of transistor 33, in the case of the present embodiment, is connected, as the output line of the pulse expander 5, to the integrating circuit 6. The circuit 6 includes resistor 39 and capacitor 41, which performs the integration, and resistor 40 and capacitor 42, which act as a filter. The audio output is taken at connection 43.

Figure 2D:
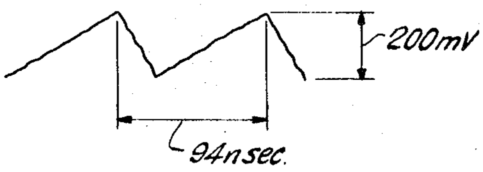

The variations in rate, i.e., current per unit of time, are translated into proportional variations in output voltage by the integrating network of resistor 39 and capacitor 41. Capacitor 41 charges through resistor 39 and builds up a greater voltage when there are more current pulses for a given time. This is reflected as a changing voltage across the load resistor 39. The changing voltage represents the audio signal. The time constant of resistor 39 and capacitor 41 must be small enough so that the audio modulation signal can be built up across resistor 39. The average DC output voltage depends on the number of pulses counted per unit time. A sawtooth-shaped ripple (pulse frequency) is superimposed upon the DC voltage, see FIG. 2D, the output pulse being shown as 94 nanoseconds wide and 200 millivolts.

The integrating circuit of resistor 39 —capacitor 41 also functions as a low-pass filter with a cutoff frequency, for example, 150 Kc. The resistor 40 and capacitor 42 form an additional low-pass network designated to prevent pulse frequency and harmonics from interfering with the output of the counter detector.

Although various values of the components may be utilized, depending upon the exact transistors used, cost considerations, and the like, the following values, given here only as examples, and without limiting intention, have been found satisfactory:

| | | |
|---|---|---|
| Capacitor 11 | mfd | .01 |
| Capacitor 20 | pfd | 1,000 |
| Capacitor 23 | mfd | .01 |
| Capacitor 29 | pfd | 1,000 |
| Capacitor 41 | pfd | 220 |
| Capacitor 42 | pfd | 47 |
| Inductance coil 10 | μh | 3.3 |
| Resistor 13 | K ohms | 1 |
| Resistor 15 | Ω ohms | 330 |
| Resistor 24 | K ohms | 1.5 |
| Resistor 22 | do | 68 |
| Resistor 26 | K ohms | 1 |
| Resistor 31 | Ω ohms | 470 |
| Resistor 38 | do | 470 |
| Resistor 39 | K ohms | 3.9 |
| Resistor 40 | do | 1 |

The differential circuit 3 may be particularly positioned before the pulse amplifier 4, i.e., at a low level of amplification. The differential circuit 3 produces sharp pulses having an exponential (differentiated) shape. Analysis shows that the relative amplitudes and harmonics of this type of pulse gives even and uneven harmonics, specifically the eighth, ninth, and 10th harmonics in the FM band (center frequency of 10.7 mc. If these harmonics reached the antenna of the receiver, the signal-to-noise ratio may decrease or oscillations occur.

In contrast, the rectangular pulse produced by the expander circuit 5 has only uneven harmonics. Only its ninth harmonic is within the FM band. It is consequently preferable to have the differential circuit 3 at a low level of amplification so that its harmonics do not have sufficient energy to interfere with reception. The pulse expander 5, which produces fewer interfering harmonics, may be positioned after the pulse amplifier 4.

I claim:

1. A broadband, low noise counter detector demodulator for a frequency modulation radio receiver in which an intermediate frequency FM signal is applied to said demodulator for detection comprising:

a limiter circuit for producing substantially uniform height pulses at the same repetition frequency as the frequency of the applied intermediate frequency FM signal, said frequency being nominally in the center of the FM band, said pulses having a rise and fall time substantially smaller than the pulse width;

a differential circuit responsive to said pulses produced by said limiter for producing relatively sharp pulses;

a broad band, one-stage transistor pulse amplifier employing controlled feedback between collector and base and responsive to the pulses produced by said differential circuit, said pulse amplifier including a series capacitor for coupling to a succeeding stage from the transistor collector electrode, said amplifier for amplifying the pulses produced by said differential circuit without deteriorating pulse rise and fall time;

a pulse expander circuit responsive to said amplified pulses using a single transistor of predetermined storage characteristics, said transistor having its base electrode connected to a series circuit including a diode and a current-limiting resistor, said series circuit being connected to circuit common, said base electrode being connected to said coupling capacitor of said amplifier stage, said coupling capacitor and series circuit forming a controlled biasing circuit for determining the amount of storage of said expander circuit so that the desired expansion of pulses is effected;

and an integrating circuit responsive to the expanded pulses for producing a demodulated audio output signal.

2. The circuit of claim 1 wherein the limiter is an overdriven integrated circuit amplifier producing square wave shaped pulses having negligible rise time and fall time.

3. The circuit of claim 1 wherein said nominal intermediate frequency FM center frequency is approximately 10.7 megacycles and said rise and fall times of said limiter output pulses are approximately 10 percent of the width of said pulses.

4. The circuit as described in claim 1 wherein said pulse amplifier includes an input coupling capacitor connected to the base electrode of said transistor, a load resistor connected to the collector of said transistor, and a feedback network connected between collector electrode and base electrode, said feedback network including a series resistor in series with a parallel-connected resistor and capacitor, the emitter of said transistor being connected to circuit common.

5. The circuit of claim 1 wherein said pulse expander transistor includes a load resistor connected to said collector electrode and wherein said emitter of said transistor is connected to circuit common.